(12) United States Patent
Zhou (10) Patent No.: US 7,305,161 B2
(45) Date of Patent: Dec. 4, 2007

(54) ENCAPSULATED PHOTONIC CRYSTAL STRUCTURES

(75) Inventor: Weidong Zhou, Mansfield, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 11/363,472

(22) Filed: Feb. 27, 2006

(65) Prior Publication Data

US 2006/0193596 A1    Aug. 31, 2006

Related U.S. Application Data

(60) Provisional application No. 60/656,343, filed on Feb. 25, 2005.

(51) Int. Cl.
*G02B 6/34*    (2006.01)
*G02B 6/00*    (2006.01)
*H01L 21/31*    (2006.01)
*H01L 21/469*    (2006.01)

(52) U.S. Cl. .................. 385/37; 385/147; 438/758; 438/780

(58) Field of Classification Search .................. 385/37, 385/147
See application file for complete search history.

(56) References Cited

U.S. PATENT DOCUMENTS

| | | | |
|---|---|---|---|
| 6,826,342 B1 * | 11/2004 | Bise et al. ................... | 385/125 |
| 6,937,804 B2 * | 8/2005 | McCoy et al. .............. | 385/122 |
| 7,043,127 B2 * | 5/2006 | Hasegawa et al. .......... | 385/125 |
| 2003/0068150 A1 * | 4/2003 | Ariel et al. .................. | 385/125 |
| 2005/0287696 A1 * | 12/2005 | Dumais et al. ............... | 438/69 |
| 2006/0084756 A1 * | 4/2006 | Southwell et al. .......... | 524/589 |
| 2006/0110116 A1 * | 5/2006 | Sakai et al. ................. | 385/129 |

* cited by examiner

*Primary Examiner*—Michelle Connelly-Cushwa
*Assistant Examiner*—Rhonda S. Peace
(74) *Attorney, Agent, or Firm*—Gardere Wynne Sewell LLP (57) ABSTRACT

Photonic crystal structures having a plurality of air columns and coating such structures to provide structures with improved performance are described herein. The coating includes a material that coats an uppermost portion of a photonic crystal structure, wherein the photonic crystal structure comprises a plurality of air columns and wherein the plurality of air columns are coated on their uppermost surface by the coating material.

6 Claims, 7 Drawing Sheets

ENCAPSULATED PHOTONIC CRYSTAL STRUCTURES

CROSS-REFERENCES TO RELATED APPLICATIONS

This application claims the benefit of U.S. Provisional Patent Application No. 60/656,343, filed Feb. 25, 2005.

BACKGROUND OF THE INVENTION

The present invention relates to the general field of photonic crystals and, in particular, as they related to integrated circuits, optical interconnects and sensors.

Photonic crystals hold great promise for new and innovative micro-and nano-photonic and other light-emitting devices and is currently the subject of extensive research worldwide. For example, photonic crystals have the capability of revolutionizing the photonic industry, doing for light what silicon did for electrons. Complete photonic integrated circuits (PICs), including lasers, modulators, lossless bends and waveguides, etc., should be able to be built monolithically on the same wafer by patterning the desired photonic crystal structure, just as the integrated circuits and lasers are fabricated now, which opens the door for mass production and high yield manufacturing and will have a profound impact economically and socially.

Current difficulties remain in the manufacturing and processing of photonic crystal structures, such as how to generate, cost-effectively, photonic crystal structures with submicron features. While e-beam lithography is widely used, additional patterning methods that are as fast or faster and low cost, repeatable and reliable are required for generating high quality submicron sized photonic crystal structures. In addition, there remains a need to manufacture photonic crystal structures apart from the current follow-on microfabrication processes used to create metal contacts, etc. This is because air column lattice photonic crystals known in the art are mechanically and chemically susceptible to disruption, damage and/or degradation as a result of the exposed air columns on their top surface. Current practice is to complete all other fabrication processes before submicron feature patterning and photonic crystal structure formation. This approach, however, limits performance because if compromises the high quality submicron feature definition of the photonic crystal structure. In addition, the approach is not suitable for large area feature definition (e.g., PICs).

Accordingly, what is needed are improved manufacturing and processing methods of photonic crystal structures, particularly those that enable the creation of large area and high quality submicron features, those that protect the photonic crystal structure, its integrity and quality during processing and improve overall performance of the structure and device made there from.

SUMMARY OF THE INVENTION

The present invention overcomes the aforementioned problems and provides photonic crystal structures as described herein having a coating for a mechanically robust structure with improved integrity and quality.

There are several benefits of the present invention. For example, the present invention provides high quality photonic crystal structures, such structures no longer requiring other fabrication processes, and thus no longer subject to deterioration, damage or degradation from the other fabrication processes. Without deterioration, damage or degradation to photonic crystal structures of the present invention, the overall performance of such structures is improved and the devices they are useful for now exhibit significant improvements in performance. With the present invention, photonic integrated circuits may be manufactured because of the compatibility between photonic crystal structure fabrication methods described herein and other microfabrication processes for such integrated circuits. Photonic crystal structures of the present invention are also more mechanically robust by being prepared from a process as described herein which is simple, reliable, easy to perform, easy to replicate and is highly cost-effective. Accordingly, the present invention will lower the cost of manufacturing such structures and the devices they are useful for.

BRIEF DESCRIPTION OF THE DRAWINGS

The above and further advantages of the invention may be better understood by referring to the following description in conjunction with the accompanying drawings, in which:

FIGS. 1A-1C depict scanning electron micrographic (SEM) images of a representative photonic crystal structure of the present invention in which

FIGS. 7A and 7B depict SEM images of a representative photonic crystal structure of the present invention in which FIGS. 8A-8B depict SEM images of another representative photonic crystal structure of the present invention in which

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1A:
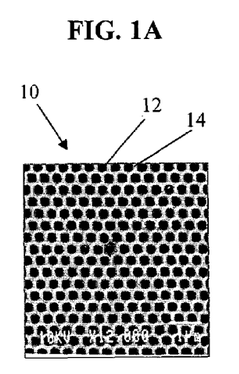
FIG. 1A is a top view.
Figure 1B:
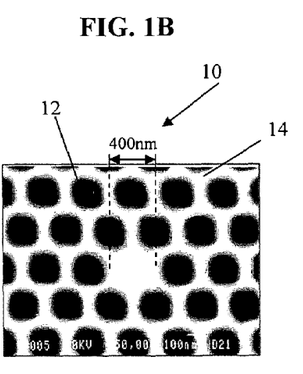
FIG. 1B is another top view at higher resolution.
Figure 1C:
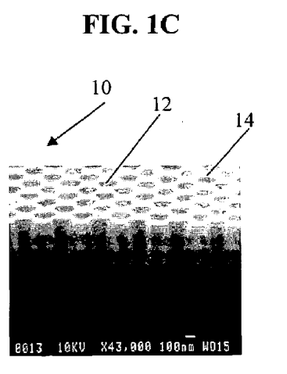
FIG. 1C is a side view.

FIG. 1A-1C depict SEM images of an initial photonic crystal structures 10 of the present invention embedded in a semiconductor substrate (white region). Structures 10 comprise two dimensional (2D) air columns 12 (dark regions) in a lattice arrangement. Air columns 12 exhibit a larger refractive index contrast between semiconductor 14 and air (which is typically 3.6 to 1) and is favorable for a large transverse electric (TE) photonic band gap (PBG). High quality 2D photonic crystal structures are typically created on as-grown semiconductor wafers (generally with a planar clean surface). No additional fabrication processes are required after photonic crystal structures have formed.

High quality photonic crystal structures as depicted in FIG. 1A-1C should remain intact when they are fabricated for a device that does not require any metallization (e.g., contacts) or further etching processes (e.g., for passive waveguide, coupler and splitter). Most devices (e.g., lasers, modulators), however, require additional microfabrication processes, including the formation of a metal contact, mesa and/or passivation. Unfortunately, typical photonic crystal structures, as depicted in FIG. 1A-1C, have exposed air columns that are highly susceptible to follow-on fabrication processes (e.g., metallization or further etching processes) in which the follow-on processes degrade and/or entirely damage the exposed air columns and their lattice arrangement.

The present invention provides a method for protecting exposed air columns of photonic crystal structures. The protection is maintained in the devices they reside in, including sensors (e.g., nano-photonic biosensor, chemical sensor, gas sensor), ultra-compact high density multilayer optical interconnect systems, in which optical interconnects provide high speed paths between backplanes (board to board), inter-chips and intra-chip as well as high performance, low power consumption and ultra-small photonic devices, such as microlasers, modulators, waveguides, lossless bends, receivers, etc.

With the present invention, a coating or layer is provided that contacts a top portion of the photonic crystal structure comprising air columns. The layer provides protection to the fabricated air columns from any subsequent fabrication processes and enables the fabrication of photonic crystal structures as PICs, while still maintaining the integrity and high quality of the underlying photonic crystal structures.

Figure 2A:
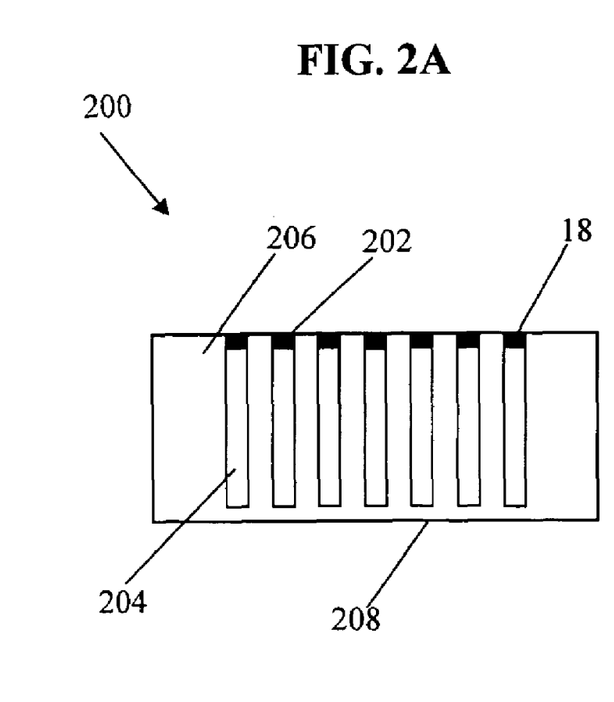
FIG. 2A depicts a schematic representation of a coating on the top portion of an air column of photonic crystal structure of the present invention.
Figure 2B:
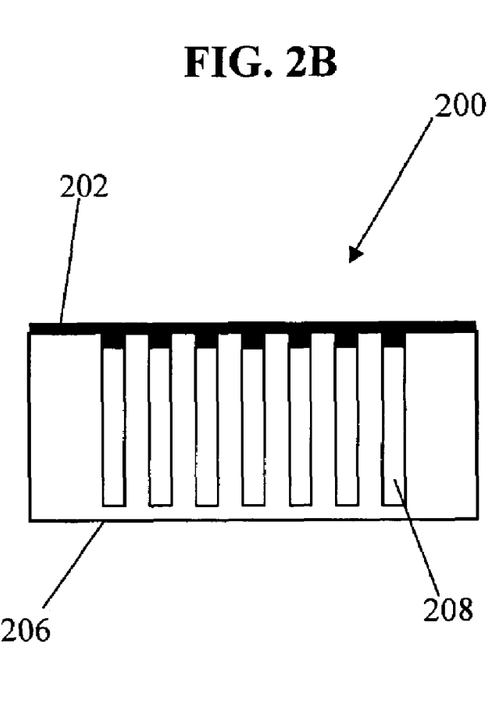
FIG. 2B depicts another schematic representation of a coating on top portion of an air column of photonic crystal structure of the present invention.
Figure 2C:
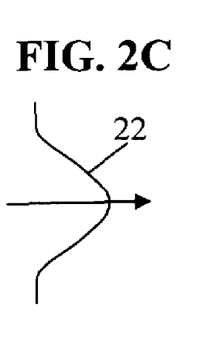
FIG. 2C depicts a schematic representation of an electrical field distribution for a properly designed cavity in a photonic crystal structure of the present invention.

Referring to FIG. 2A and 2B, the schematics illustrate a photonic crystal structure 200 comprising a coating 202 on its top portion 206. Photonic crystal structures of the present invention may include any photonic crystals structure, such as air-hole based 2D photonic crystal slab structures and planar 2D air-hole photonic crystal slab waveguide structures. The coating may be applied in many ways, including capping as illustrated in FIG. 2A in which the coating is in contact only with each air column 204. In addition, the coating may be applied by a layering as illustrated in FIG. 2B in which coating 202 also appears as a thin layer on the uppermost surface of structure 200. When properly applied, coating 202 has minimal if any impact on any final device for with the photonic crystal structures are used and will not affect performance of such devices. This is because light when guided through the vertical cavity of air columns 204 will provide an electrical field 22 distribution in the center of photonic crystal structure 200 and any electric field at top portion 206 (as well as bottom portion 208) will be minimal (FIG. 2C). The coating enables an efficient electrical injection by placing the coating contact on top of the air holes near the center of the light emission core. The coating further provides protection to the fabricated air-column structure from any subsequent fabrication processes.

There are several features of a coating of the present invention. For example, the material useful for coating should be photopatternable and be capable of being removed in its entirety or selectively (e.g., by wet or dry etching). In addition, the coating should exhibit a relative low refractive index (n~1.5) and have a minimal impact to the photonic band gap and defect mode. Further, the coating should transparent to the light of interest (thereby providing minimal optical loss) and should be chemically stable so that it does not itself degrade or affect the surface or top portion of the photonic crystal structure. Finally, the coating should provide surface passivation. Preferred coating materials are low cost optical, can be deposited in a highly uniform manner using conventional techniques, are photopatternable, exhibits a good refractive index, do not provide surface degradation, and its thickness can be controlled by technique used to apply coating. Materials suitable for coating with the present invention may be in solution. Sol-gels are particularly suitable. As are polymers, polymer blends, silicondioxide, particles or spheres, gallium arsenide, indium phosphide, other semiconductor materials, noble metals, alkali metals, earth metals, Group III metals, Group VI metals, transition metals, and combinations thereof.

Methods of providing a coating to a photonic crystal structure of the present invention include growth, wafer fusion, angled sputtering, spin coating, dip-into solutions, as some examples. Those of skill in the art will appreciate that additional alternatives may also be useful. Examples of methods for coating a photonic crystal structure of the present invention are further described below.

Figure 3A:
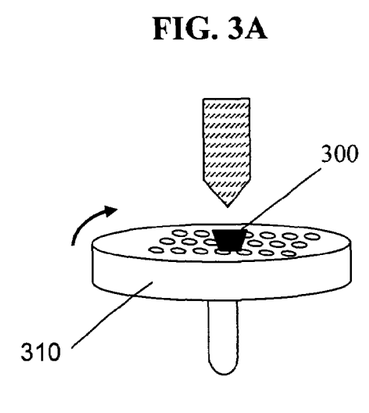
FIG. 3A is a schematic representation of spin coating as described with the present invention.
Figure 3B:
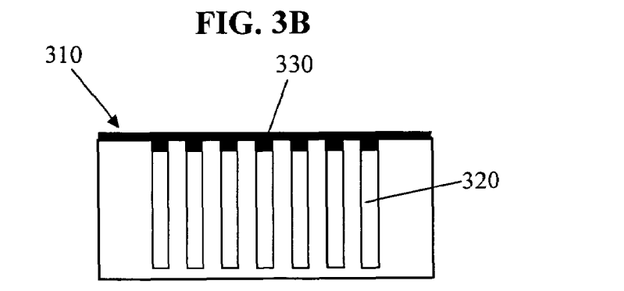
FIG. 3B is a schematic representation of curing as described with the present invention.
Figure 3C:
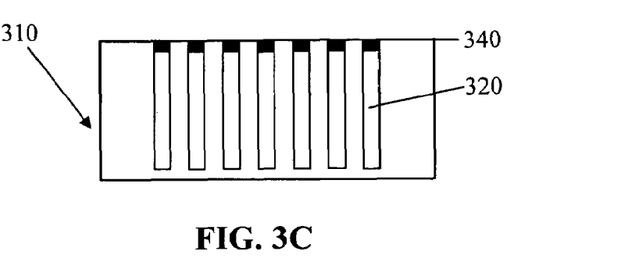
FIG. 3C is a schematic representation of lapping as described with the present invention.

Referring now to FIG. 3A-3C, the schematics represent an example of a method of the present invention in which the coating is applied by spin coating, similar to that used for the application of thin films as is known to one of ordinary skill in the art. With this method, a small amount of coating material 300 is added to the center of a photonic crystal structure 310 (or device comprising one or more photonic crystal structures) and structure (or device) 310 is then spun at high speed (typically at or about 3000 rpm). Centripetal acceleration will cause coating material 300 to spread and eventually reach the edge of structure 310 leaving a thin film of coating material 300 on the top surface of structure 310. The thickness of the film formed by the coating material depends on the nature of the material (e.g., viscosity, drying rate, percent solids, surface tension, etc.) and the spin process (e.g., rotational speed, acceleration, and fume exhaust). Following spin coating, the film formed by the coating may undergo curing (FIG. 3B) or lapping (FIG. 3C).

When using a spin coating method, viscous flow and evaporation of the coating material help direct how expansive a film is formed by the coating material. Viscosity affects radial flow of the coating material. As the coating material expands and thins, the rate of evaporation of the material may become more important. Additional features such as hydrolysis and condensation reactions may also be important. Importantly, with the present invention, the intrusion depth of the coating material may be controlled based on the method used to apply the coating.

Figure 4A:
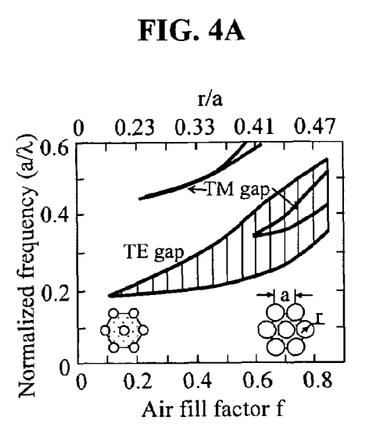
FIG. 4A is a graphical representation of a photonic band gap map for a 2D air column triangular lattice photonic crystal structure of the present invention.
Figure 4B:
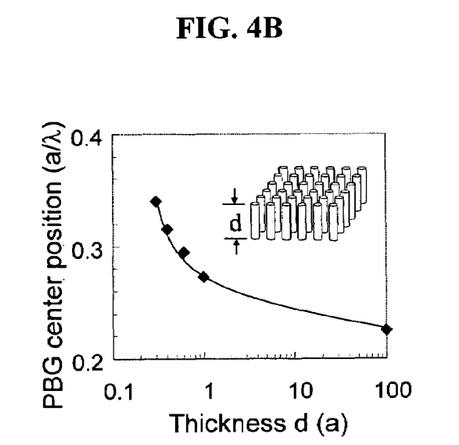
FIG. 4B is a graphical representation of thickness versus photonic band gap center frequency.

FIG. 4A depicts a 2D air column triangular lattice photonic crystal PBG map showing triangular lattice air-hole structures with different air fill factors. FIG. 4B depicts the impact of finite thickness in a third dimension on PBG position, taking into account finite height on third dimensions.

Figure 5A:
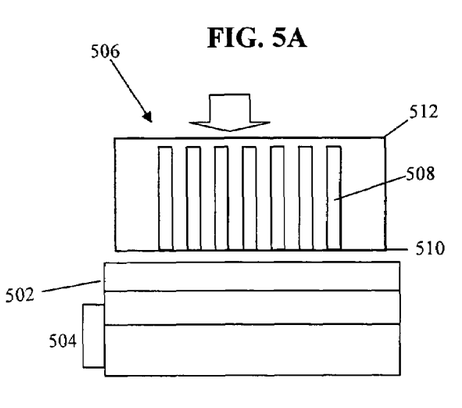
FIG. 5A is a schematic representation of a portion of a process of the present invention depicting a photonic crystal structure of the present invention with air columns in the upside down position.
Figure 5B:
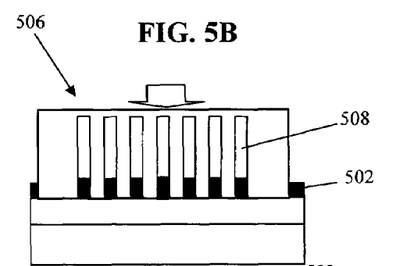
FIG. 5B is a schematic representation of a portion of a process of the present invention depicting the application of pressure to a photonic crystal structure of the present invention.
Figure 5C:
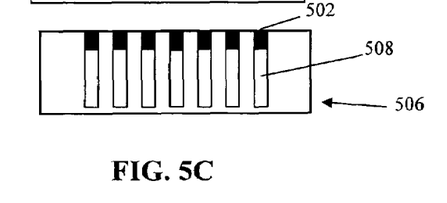
FIG. 5C is a schematic representation of a portion of a process of the present invention depicting a photonic crystal structure of the present invention after curing.

Referring now to FIG. 5A-5C, the schematics represent another example of a method of the present invention in which the coating is applied to a photonic crystal structure of the present invention by dip-into-solution. In FIG. 5A, a coating 502 resides on the uppermost surface of substrate (e.g., silicon or silicon oxide substrate). The coating may be applied to the substrate using methods known to one of ordinary skill in the art, including a spin coating method. In FIG. 5A and 5B, a photonic crystal structure 506 having air columns 508 is flip-chipped and pressure pressed into coating 502. As such, structure 506 is positioned such that the uppermost surface 510 is on the bottom and the bottom surface 512 is upwardly facing. Upon removal of excess coating on the edges, the coating is cured and released from substrate 504 by applying light pressure (FIG. 5B) and the structure is then returned to its upright position (FIG. 5C) in which structure 506 contains coating 502 only in the uppermost portion of columns 508. Pressure may be adjusted in order to obtain more or less coating in the uppermost portion of columns 508.

Figure 6A:
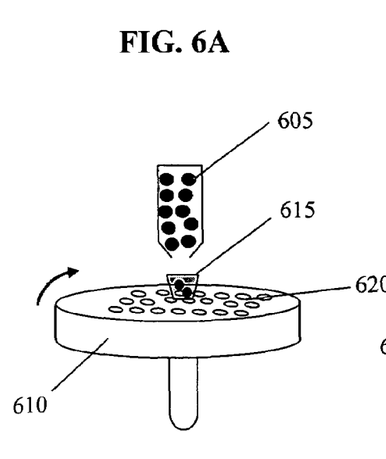
FIG. 6A is a schematic representation of a portion of a self assembly process of the present invention depicting a particle suspension contacting a surface of a photonic crystal structure of the present invention.
Figure 6B:
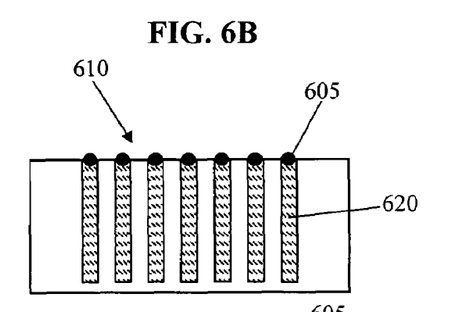
FIG. 6B is a schematic representation of a portion of a self assembly process of the present invention depicting one or more particles on a top surface of a photonic crystal structure of the present invention and solution within one or more columns of the photonic crystal structure.
Figure 6C:
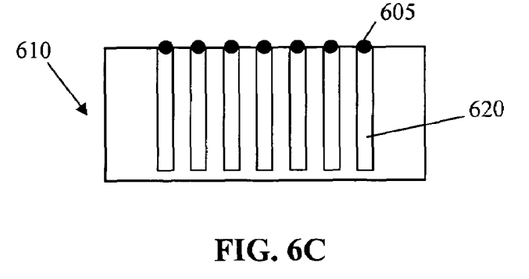
FIG. 6C is a schematic representation of a portion of a self assembly process of the present invention depicting one or more spheres or particles on a top surface of a photonic crystal structure of the present invention and the absence of solution within one or more columns of the photonic crystal structure.

Referring now to FIG. 6A-6C, the schematics represent yet another example of a method of the present invention in which the coating is applied to a photonic crystal structure of the present invention using small spheres or particles 605 provided in a suspension. FIG. 6A illustrates a method by which particles 605 provided in a suspension are applied to a photonic crystal structure 610 using a spin coating method similar to that described with FIG. 3A-3C. Particle size is chosen such that the average particle diameter is larger than the average diameter of the air columns. The solution used with the particles is typically a solvent that can evaporate with heat. Upon placing a particle suspension 615 in the center of structure 610, the structure is spun allowing particles 605 to rest on the top of air columns 620 as depicted in FIG. 6B. To remove the solvent, photonic crystal structure 610 may be placed in an oven or subject to the heat (e.g., heat lamp). Structure may also undergo a slow spinning while the solvent is evaporated. In the end, particles 605 remain and seal air columns 620 as depicted in FIG. 6C. By further providing a vacuum, particles may be partially forced in air columns 620 to prevent movement or later release.

Figure 7A:
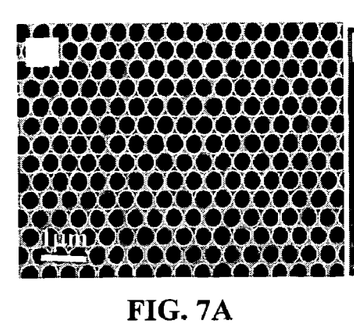
FIG. 7A is an image taken before a coating process of the present invention and FIG. 7B is an image taken after a coating process of the present invention.
Figure 7B:
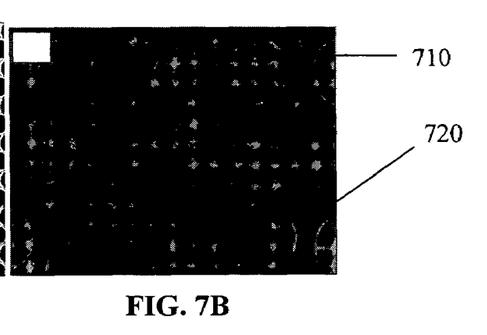
Figure 8A:
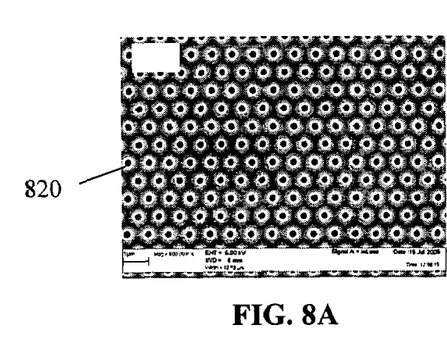
FIG. 8A is an image taken before a coating process of the present invention and FIG. 8B is an image taken after a coating process of the present invention.
Figure 8B:
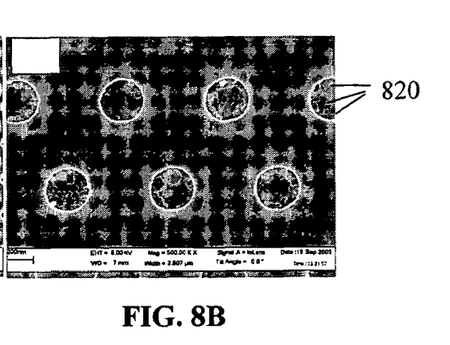

The examples described above have been tested by simulation (Zhou, Appl. Phys. Lett 2006;88:051106-1-051106-3, see pg. 051106-2 second column to and of 051106-3 first column; incorporated herein by reference) in which were found a large process tolerance on the coating thickness and refractive index. In addition, FIGS. 7 and 8 illustrate additional examples of coating a photonic crystal structure of the present invention. For these examples, a. 2D photonic crystal slab (PCS) structure on a silicon substrate was fabricated with e-beam lithography and reactive ion etching. Air columns had a typical radius of about 0.13 µm. The lattice constants were varied in order to optimize the coating conditions. SEM images of 2D PCS structures having a lattice constant of about 0.4 µm before and after encapsulation are shown in FIG. 7A and 7B, respectively. Polystyrene spheres with a nominal (typical diameter) size of 300 nm were spin coated on top of the PCS structure, using a spin speed of 3.5 krpm and a duration of 40 seconds. After spin coating, the PCS structures were air dried. As depicted in FIG. 7B, there is a non-uniformity of polystyrene spheres 710 on the surface of the PCS structure 720, which is due to a very high PCS r/a ratio (e.g., ratio between air hole/column radius r and lattice constant a). A high uniformity was achieved with a relatively low r/a ratio by applying smaller diameter nanoparticles or spheres to the PCS structures. As shown in FIGS. 8A and 8B, by using smaller silica nanoparticles 810 with typical size (diameter) of 70 nm, nanoparticles were successfully back-filled into air columns with air hole radius of r=0.18 µm and lattice constant of a=1 µm. While a low r/a ratio PCS structure favors more uniform assembly of nanoparticles and, thereby coating of the material, a higher r/a ratio PCS structure is desirable due to its larger gap size. Weight-volume control of particle suspension and selective surface property modification of such particles will provide for a more uniform coating of such photonic crystal structures. Both the more uniform (as depicted in FIG. 8B) and the lesser uniformity particles or spheres (as depicted in FIG. 7B) are acceptable with the present invention because the primary purpose of the coating process as described herein is to facilitate the metallization on top of the air column (air hole) region, both of which accomplish this task.

As provided herein, the present invention includes coating methods believed essential for large-scale multilevel vertical integration and high performance functioning of photonic crystal structures and the devices they reside in. As described herein, such photonic crystal structures may be useful for application to efficient electrical injection of photonic crystal surface emitting lasers or other such devices, such as photonic integrated circuits. Accordingly, the present invention promotes the creation of robust, low-power consuming, ultra-compact high density multilayered optical interconnect systems, for use in, for example, stacked air column photonic crystal applications, high speed application, inter-chips, intra-chips, microlasers, modulators, waveguides, lossless bends and receivers.

Although preferred embodiments have been described in detail herein, it will be appreciated that the present invention is discussed in detail herein. It will further be appreciated that the present invention provides may applicable inventive concepts that can be embodied in a wide variety of specific contexts. For example, it is to be understood that additional coating materials, such as those incorporating silicon, gallium arsenide and indium phosphide may also be used with the present invention. The specific embodiments discussed herein are merely illustrative of specific ways to make and use the invention, and do not delimit the scope of the invention. Those skilled in the art will recognize that various substitutions and modifications may be made to the invention without departing from the scope and spirit of the appended claims.

What is claimed is:

1. A method of coating semiconductor encapsulated photonic crystal structures comprising the step of:

coating an uppermost portion of a photonic crystal structure with a coating material, wherein the photonic crystal structure comprises a plurality of air columns and wherein the plurality of air columns are coated on their uppermost surface by the coating material and wherein the photonic crystal structure is flip-chipped into the coating material.

2. The method of claim 1 further comprising infiltrating a portion of the uppermost portion of each air column with the coating material.

3. The method of claim 1 further comprising dipping the photonic crystal structure into a solution containing the coating material.

4. The method of claim 1 further comprising spin coating the material onto the uppermost portion of the photonic crystal structure.

5. The method of claim 1, wherein the coating material is selected from the group consisting of a polymer, polymer blend, silicon-dioxide, nanoparticle, gallium arsenide, indium phosphide, semiconductor compound, noble metal, alkali metal, earth metal, Group Ill metal, Group VI metal, transition metal, and combinations thereof.

6. The method of claim 1, wherein the coating material is provided as a gel, sol-gel, solution, thin film, polymerizable material, curable material, photolabile material, photopatternable material and any combination thereof.

* * * * *